UNITED STATES PATENT OFFICE.

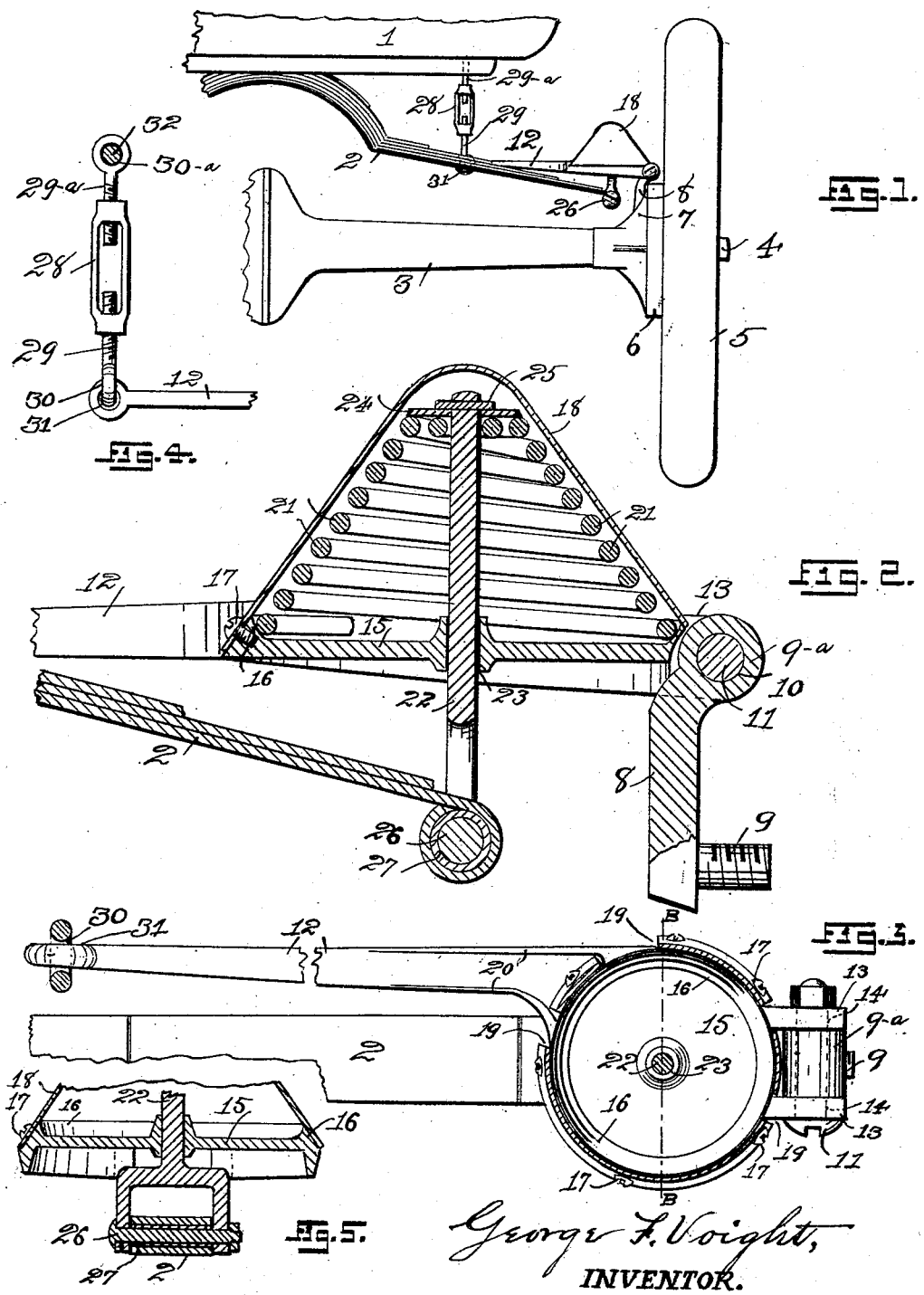

GEORGE F. VOIGHT, OF SAN FRANCISCO, CALIFORNIA.

SPRING SUSPENSION FOR AUTOMOBILES.

1,258,280. Specification of Letters Patent. Patented Mar. 5, 1918.

Application filed January 2, 1917. Serial No. 140,235.

*To all whom it may concern:*

Be it known that I, GEORGE F. VOIGHT, a citizen of the United States, residing at San Francisco, in the county of San Francisco and State of California, have invented a new and useful Improvement in Spring Suspensions for Automobiles, of which the following is a specification.

My invention relates to improvements in spring suspension for automobiles in which a suspension lever carrying an auxiliary coil-spring works coöperatively with principal leaf-spring. An object of the invention is to provide means that will assist the principal leaf-spring to cushion the automobile against the unevenness of the roadway, particularly the minor and lighter bumps.

With the foregoing and other objects in view which will appear as the description proceeds, the invention resides in the combination and arrangement of parts and in the detail of construction hereinafter described and claimed, it being understood that changes in the precise embodiment of the invention herein disclosed can be made within the scope of what is claimed without departing from the spirit of the invention.

In the drawings:

Figure 1 is a rear side elevation of the right-hand portion of an automobile, showing a rear right-hand wheel, a portion of the rear axle, the principal rear leaf-spring, a fragment of the body and frame, and my invention applied.

Fig. 2 is a rear side sectional view of my invention, with a portion broken away.

Fig. 3 is a top view of a portion of the invention with certain parts in section, and certain other parts removed.

Fig. 4 is a side elevation of a portion of the present invention.

Fig. 5 is a sectional view of the invention on line B B, Fig. 3, looking in a direction from the body to the wheel of the automobile, a portion of the invention being removed and other portions being broken away.

Referring to the drawings,—

1 designates the body and frame of an automobile supported by a bowed principal leaf-spring 2 disposed a suitable distance above, and in line with, an axle housing 3 inside of which is journaled for rotation an axle 4 supporting the wheel 5 provided at its inner side with a brake drum 6. At the outer end of the axle housing 3 is an axle housing flange 7. 8 is a perch or hanger rigidly fastened to the said flange 7 by means of the outstanding threaded portion 9 engaging an opening therefor through said flange. The perch 8 has a T-head 9a overhanging the brake drum 6, and is provided with an eye 10 in which is disposed a pin 11 pivotally supporting the outer end of an oscillatory suspension lever 12 by means of the ears 13 having eyes 14 jointly engaging the pin 11. Adjacent the outer end of the lever 12 is a web portion 15 having one of its flat sides facing upward which is provided with an upstanding annular rib 16. Over the web portion 15 and overlapping the rib 16 from the outer side is disposed, and secured by means of screws 17, a cone shaped spring cover 18, said spring cover 18 being provided with notches 19 adjacent its open end, for the reception of stiffening ribs 20 and the ears 13. Upon the upper side of the web portion 15, and inside of the rib 16, is seated the dilated end of a cone shaped spiral compression spring 21 supporting a vertical hanger pin 22, the shank portion of the said pin being fitted slidably through an opening 23 in the center of the web portion 15, the upper end of the shank portion passing through an opening in the apex of the spiral spring 21 and is secured in the desired position by means of a washer 24 and a retaining pin 25. The lower end of the hanger pin 22 is forked, the forks carrying between them a spring pivot pin 26, which pin pivotedly supports the outer end of the principal leaf-spring 2 by passing through the eye 27 extending transversely through the end of said leaf-spring. The said spiral spring 21, by means of the intermediate connection means provided by the hanger pin 22, yieldingly supports the said principal leaf-spring 2, and the said leaf-spring in turn yieldingly supports the body and frame of the automobile.

The inner end of the suspension lever 12 is supported by the frame and body of the automobile, and is anchored thereto by means of an adjustable connection means consisting of a turn-buckle assembly, said turn-buckle assembly comprising an intermediate internally threaded portion 28, having one end threaded in the conventional right-hand manner and the opposite end threaded in an opposite or left-hand manner. Said threaded ends threadedly engaging the shank ends of eye-bolts 29 and 29ᵃ having eyes 30 and 30ᵃ respectively. The eye 30 of the eye-bolt 29 interlocks with the eye 31 at the inner end of the suspension lever 12, and the eye 30ᵃ pivotedly engages the pivot pin 32 which is suitably fastened to an under portion of the frame or body of the automobile. The turn-buckle assembly is provided with a suitable oscillatory movement upon the pin 32, transversely relative to the frame or body of the automobile. By turning the said internally threaded intermediate portion 28 of the said turn-buckle assembly in the proper direction the inner end of the suspension lever 12 will be raised up relative to the body of the automobile, which would be desirable in case of a heavy load being carried by the automobile, and by turning the said intermediate portion 28 in the opposite direction, the said inner end of the lever 12 will be lowered relative to the body of the automobile, which would be desirable when the automobile is lightly loaded.
The inner end of the suspension lever 12 moves upwardly and downwardly with the upward and downward movements of the body of the machine, and approximately travels the same distances in said movements.

While I have shown my invention as applied to the rear right-hand end of an automobile axle, it is obvious that it is applicable to the left-hand end as well as to the right-hand end, and to the front as well as to the rear axle.

Having thus described my invention, I claim:

1. A spring suspension for automobiles comprising, in combination with the vehicle body and principal leaf spring and the axle assembly, an oscillatory lever having its outer end pivotedly supported by the axle assembly, a non-resilient connection between the inner end of the lever and the body, an auxiliary spring carried by the lever and a connection between the auxiliary spring and the outer end of the principal spring.

2. A spring suspension for automobiles comprising, in combination with the vehicle body and principal leaf spring and the axle assembly, a lever having its outer end pivotedly supported by the axle assembly, a non-resilient connection between the inner end of the lever and the body of the automobile whereby the said inner end will move upwardly and downwardly with the upward and downward movements of the body, an auxiliary spring carried by the lever, and a connection between the auxiliary spring and the outer end of the principal spring.

3. A spring suspension for automobiles comprising, in combination with the vehicle body and principal leaf spring and the axle assembly, a lever having its outer end pivotedly supported by the axle assembly, a non-resilient connection between the inner end of the lever and the body of the automobile whereby the said inner end will move upwardly and downwardly with the upward and downward movements of the body, the lever having an outer portion over-hanging the outer end of the principal spring and an inner portion bent to one side of the spring so as to be free to move alongside of it, an auxiliary spring carried by the lever, and a connection between the auxiliary spring and the outer end of the principal spring whereby the latter is yieldingly supported by the former.

4. A spring suspension for automobiles, comprising a principal leaf spring, an axle assembly, a lever pivoted at one end to the axle assembly, a support vertically movable relative to the axle assembly, a non-resilient connection between said support and the free end of the lever, and a resilient connection between the lever intermediate its ends and the principal leaf spring.

5. A spring suspension for automobiles, comprising, in combination with the vehicle body and principal leaf spring and the axle assembly, of an oscillatory lever, the lever having an outer transversely dilated section over-hanging the outer end of the principal spring and an inwardly extending section extending along one side of the spring and free to move relatively thereto, the outer section being pivotally connected to the axle assembly, a vertically non-resilient depending connecting element having its upper end connected to the body and its lower end coupled to the inner end of the lever, a spiral compression spring seated upon the dilated section, and a connection between the spiral spring and the principal leaf spring.

6. A spring suspension for automobiles comprising, in combination with the vehicle body and principal leaf spring and the axle assembly, of an oscillatory lever pivoted to the axle assembly and having a section over-hanging the outer end of the principal leaf spring and an inner section extending along one side of the spring so as to be free to move relatively thereto, a non-resilient connecting element having its upper end flexibly coupled to the body and its lower end flexibly coupled to the inner end of the lever, the arrangement being such that the said inner end is non-yieldingly vertically suspended from the body, and a connection between the lever and the spring.

7. A spring suspension for automobiles comprising, in combination with the vehicle body and principal spring and the axle assembly, of an oscillatory lever pivoted to the axle assembly and having an inner section extending along one side of the principal spring so as to be free to move relatively thereto, a connecting element having its upper end flexibly coupled to the body and its lower end flexibly coupled to the inner section of the lever, the connecting element being non-resilient longitudinally, and a connection between the lever and the principal spring.

8. A spring suspension for automobiles comprising, in combination with the vehicle body and principal leaf spring and the axle assembly, of an oscillatory lever pivotedly supported by the axle assembly and having an inner section extending along one side of the said spring so as to be free to move relatively thereto, a connecting element having its upper end coupled to the body and its lower end oscillatably suspended therefrom and flexibly coupled to the inner section of the lever, the element being non-resilient longitudinally of itself, and a connection between the lever and the principal spring.

9. The combination with an automobile running gear and vehicle body and principal leaf spring therefor, a spring suspension comprising a hanger rigidly supported by the running gear, the hanger having an opening in its upper end, the opening extending transversely relative to the axle of the automobile, an oscillatory lever, the lever having at its outer end a relatively large circular portion, the circular portion having adjacent its outer margin a pair of outwardly extending ears, the ears having transverse openings in their outer ends and over-lap one on each side the upper end of the hanger and so that the openings in the one will register with the opening in the other, a pivot pin fitted in said openings and threadedly engaging one of said ears, a non-resilient adjustable connection between the inner end of the lever and the body, the connection permitting a certain side swaying of the body relative to the lever, the enlarged circular portion having an annular upstanding rim adjacent its periphery, a spiral compression spring seated upon the enlarged portion inside of the rim, and a connection between the latter spring and the principal spring.

10. A spring suspension for automobiles comprising, in combination with the vehicle body and principal spring and the axle assembly, of a lever having its outer end pivotedly supported by the axle assembly, the lever having an outer section over-hanging the outer end of the principal spring and a second and inwardly extending section disposed at one side of the spring so as to be free to move alongside of it, an adjustable connection between the automobile body and the inner end of the lever, the arrangement being such that the latter is non-resiliently supported by the former at an elevation that can be either increased or decreased relatively thereto by manipulating said connection, an auxiliary spring carried by the lever, and a connection between the auxiliary spring and the outer end of the principal spring.

11. A spring suspension for automobiles comprising, in combination with the vehicle body and principal spring and the axle assembly, of a lever having its outer end pivotedly supported by the axle assembly, the lever having an outer section over-hanging the outer end of the principal spring and a second and inwardly extending section disposed at one side of the spring so as to be free to move relatively thereto, an adjustable connection between the automobile body and its frame and the inner end of the lever, the connection embodying an upper section connected to the automobile body or frame and a lower section connected to the inner end of the lever and an intermediate nut section threadedly engaging said former sections, and a resilient connection between the lever and the outer end of the principal spring.

12. A spring suspension for automobiles comprising, in combination with the vehicle body and principal spring and the axle assembly, of a lever having its outer end pivotedly supported by the axle assembly, the lever having an outer section over-hanging the outer end of the principal spring and a second and inwardly extending section disposed to one side of the said spring so as to be free to move relatively thereto, an adjustable connection between the automobile body or frame and the inner end of the lever, the arrangement being such that the latter can be supported by the former at different distances relative thereto, the connection embodying an upper threaded section pivotedly connected to the body or frame and a lower threaded section coupled to the inner end of the lever and an intermediate nut section threadedly engaging the said former sections, and a connection between the lever and the outer end of the principal spring.

13. A spring suspension for automobiles, comprising a principal leaf spring, an axle assembly, an oscillatory lever, a pivotal connection between one end of said lever and the axle assembly, a support, the support being vertically movable relative to the axle assembly, a rigid link connection between the support and the free end of the lever, the lever having a portion of its free end bent to one side of the principal leaf spring so as to be free to work alongside of it, an auxiliary spring carried by the lever, and a connection between the auxiliary spring and the outer end of the principal leaf spring.

14. The combination with a spring suspension for automobiles embodying a principal leaf spring, an axle assembly, a lever having its outer end pivotedly supported by the axle assembly, and a connection between the lever and the outer end of the spring, of a connection between the inner end of the lever and either the body or the frame of the automobile, the connection being non-resilient but adjustable whereby the said inner end of the lever can be non-resiliently suspended at a predetermined and alterable distance below the body or frame.

15. The combination with a spring suspension for automobiles comprising a principal leaf spring, an axle assembly, a lever having its outer end pivotedly supported by the axle assembly, and a connection between the lever and the outer end of the spring, of a depending connection having its upper end pivotedly connected to either the body or the frame of the automobile and its lower end flexibly coupled to the inner end of the lever, the connection being non-resilient longitudinally but adjustable whereby the said inner end of the lever can be suspended at a predetermined but alterable distance below the body or frame.

16. The combination with a spring suspension for automobiles comprising a principal leaf spring, an axle assembly, a lever having its outer end pivotedly supported by the axle assembly, the lever having an outer section over-hanging the outer end of the spring and a second and inwardly extending section disposed at one side of the spring so as to be free to move relatively thereto, and a connection between the outer end of the spring and the lever between its ends, of an adjustable connection between either the body or the frame of the automobile and the inner end of the lever, the latter connection comprising an upper threaded section pivotedly connected to the body or frame and a lower threaded section flexibly coupled to the inner end of the lever and an intermediate nut section threadedly engaging the aforesaid sections whereby the inner end of the lever can be either raised or lowered relative to the body or frame by turning said nut in the proper direction.

17. The combination with a spring suspension for automobiles comprising a principal leaf spring, an axle assembly, a lever having its outer end pivotedly supported by the axle assembly, the lever having an outer section over-hanging the outer end of the spring and a second and inwardly extending section disposed at one side of the spring so as to be free to move relatively thereto, and a connection between the outer end of the spring and the lever between its ends, of a connection between either the body or the frame of the automobile and the inner end of the lever, the latter connection being non-resilient longitudinally of itself and having its upper end supported by the body or frame and its lower end coupled to the inner end of the lever.

GEORGE F. VOIGHT.